United States Patent [19]

Luthi

[11] Patent Number: 4,515,693

[45] Date of Patent: May 7, 1985

[54] FIBERGLASS-REINFORCED SOLID PLASTIC DRUM

[75] Inventor: Oscar Luthi, Nashua, N.H.

[73] Assignee: Ingersoll-Rand Company, Woodcliff Lake, N.J.

[21] Appl. No.: 294,461

[22] Filed: Aug. 20, 1981

[51] Int. Cl.³ .............................................. B01D 33/06
[52] U.S. Cl. ....................................... 210/402; 210/406
[58] Field of Search ............................... 210/402–404, 210/406

[56] References Cited

U.S. PATENT DOCUMENTS

| | | | |
|---|---|---|---|
| 3,013,666 | 12/1961 | Krynski | 210/404 |
| 3,175,690 | 3/1965 | Sirles et al. | 210/404 |
| 3,200,951 | 8/1965 | Krynski | 210/404 |
| 3,494,473 | 2/1970 | Krynski | 210/404 |
| 3,504,802 | 4/1970 | Luthi | 210/404 |
| 3,794,178 | 2/1974 | Luthi | 210/404 |
| 3,894,899 | 7/1975 | Konopatov et al. | 210/404 X |
| 4,154,687 | 5/1979 | LaValley | 210/404 X |
| 4,248,716 | 2/1981 | LaValley | 210/402 |
| 4,276,169 | 6/1981 | Browne et al. | 210/404 |

Primary Examiner—Robert H. Spitzer
Attorney, Agent, or Firm—F. S. Troidl

[57] ABSTRACT

A solid, fiberglass-reinforced plastic rotary drum filter includes a first solid fiberglass-reinforced head at one end and a second solid fiberglass-reinforced head at the other end. A central solid fiberglass-reinforced plastic pipe extends from one plastic head a predetermined distance into the plastic drum. A plurality of radial, solid fiberglass-reinforced plastic drainage conduits extends from the solid fiberglass-reinforced plastic deck of the plastic drum to the central pipe. The longitudinal separation between the radial plastic drainage conduits and the first plastic head is carefully chosen and the dimensions of the first plastic head are such that the first plastic head is strong enough to withstand the head-bending force due to radial force, drive torque, and hydraulic end force.

2 Claims, 4 Drawing Figures

FIBERGLASS-REINFORCED SOLID PLASTIC DRUM

This invention relates to rotatable, vacuum or pressure washer drums used for washing pulp in pulp mills. More particularly, this invention is a pulp-washing drum which is essentially totally made of solid fiberglass-reinforced plastic.

Government environmental protection agencies are continuously requiring the pulp industry to reduce or eliminate all effluents from pulp mills. Consequently, the chemical concentration in the liquors used in the mills is increasing, and washer drums are more and more subjected to corrosion from the concentrated liquors, especially in the bleach plant. In many cases 317 low carbon stainless steel cylinders are completely corroded in less than one year of service.

Titanium-lined cylinders will withstand corrosive attack but the cost is very high. Also, fatigue cracks in the titanium liner usually means complete destruction of the mild steel support structure in a very short time. Drums have been made with mild steel substructures covered with fiberglass-reinforced plastic. However, these fiberglass-reinforced covered machines have the same problem as titanium-lined machines, namely, any imperfections or cracking in the covering will expose the substructure to the corrosive liquid and will lead to failure. Differences in thermal-expansion between fiberglass-reinforced plastic and the mild steel substructures can also lead to failure.

A rotary drum filter made almost entirely of solid fiberglass-reinforced plastic would be highly desirable. The fiberglass-reinforced plastic has good chemical resistance. However, it is not very useful as a structural material. For example, it has low strength, all fatigue stresses must be kept very low. It has a low modulus of elasticity; the cylinder must be designed to avoid excessive deflections: Also, it has a high coefficient of thermal expansion. Therefore, any solid fiberglass-reinforced plastic cylinder must be constructed to allow for thermal expansion without excessive stresses due to a difference in thermal expansion.

This invention is a new rotary drum filter which is made essentially of solid fiberglass-reinforced plastic. The arrangement of the elements in this new rotary drum filter is such that no excessive fatigue stresses occur at any point on the fiberglass-reinforced plastic drum. The structure of this new rotary drum filter is also such that excessive deflections are avoided. Finally, the structure is such that thermal expansion is allowed without the occurrence of excessive stresses due to a difference in thermal expansion.

Briefly described, the invention comprises a rotary drum filter which is made primarily of fiberglass-reinforced plastic. The deck and both heads are made of fiberglass-reinforced plastic. A central fiberglass-reinforced plastic pipe extends from the first plastic head a predetermined distance into the plastic drum. A plurality of radial, fiberglass-reinforced, plastic drainage conduits extend from the deck of the drum to the central plastic pipe. The longitudinal separation between the plastic drainage conduits and the first plastic head and the dimensions of the first plastic head are such that the first plastic head is strong enough to withstand the radial force, drive torque, and hydraulic end force.

The invention, as well as its many advantages, may be further understood by reference to the following detailed description and drawings in which.

In the various figures, like parts are referred to by like numbers.

Figure 1:
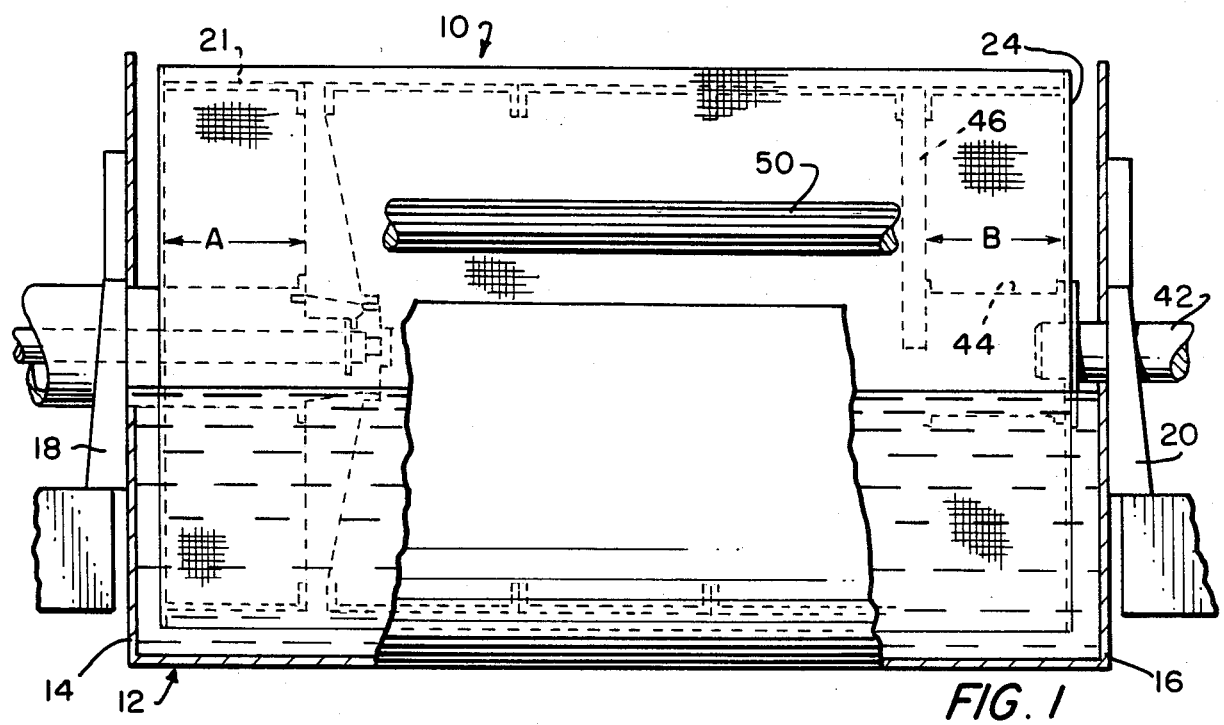
FIG. 1 is a side elevational view, with portions cut away, of the rotary drum filter.

Referring to the drawings, and more particularly, to FIG. 1, the rotary drum shown includes a rotary drum 10 rotatably mounted in a support vat 12. The vat 12 includes upstanding peripheral or end walls 14 and 16. The vat 12 will contain a liquid slurry such as a pulp slurry. Support pedestals 18 and 20 are located at opposite ends of the drum 10 outside the vat 12 for rotatably supporting the opposite ends of the drum 10.

The drum 10 has a fiberglass-reinforced plastic deck 21. A pair of axially-spaced heads 22 and 24 support the ends of deck 21. The heads 22 and 24 are also made entirely of fiberglass-reinforced plastic. Although the drawing does not show such structure, the drum may contain additional reinforcing structure to give it sufficient strength and rigidity for serving its function.

A central fiberglass-reinforced plastic pipe 26 (see FIG. 2) extends from the head 22 a predetermined distance into the drum. A fiberglass-reinforced plastic hub 28 covers the inside end of the fiberglass-reinforced plastic pipe 26. A carbon bushing 30 which encloses a titanium sleeve 32 is mounted in the bore 33 of hub 28. A stationary central shaft 34 of less diameter than fiberglass-reinforced plastic pipe 26 is located within pipe 26. The smaller diameter end 36 of the stationary shaft 34 extends through the titanium sleeve 32. A fiberglass-reinforced plastic valve segment 38 is mounted on shaft 34.

Figure 2:
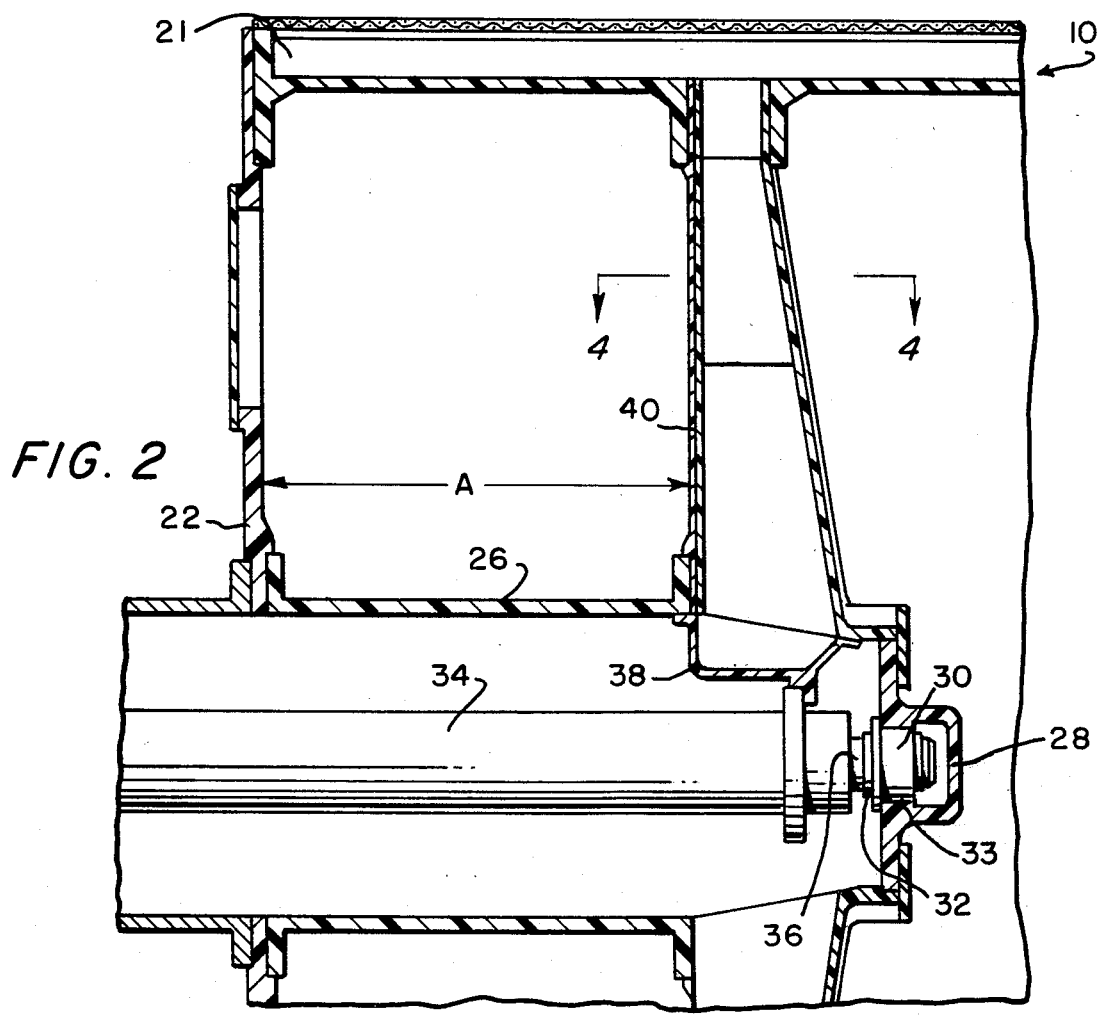
FIG. 2 is a sectional view, on an enlarged scale, showing important inventive features of the rotary drum of FIG. 1.
Figure 3:
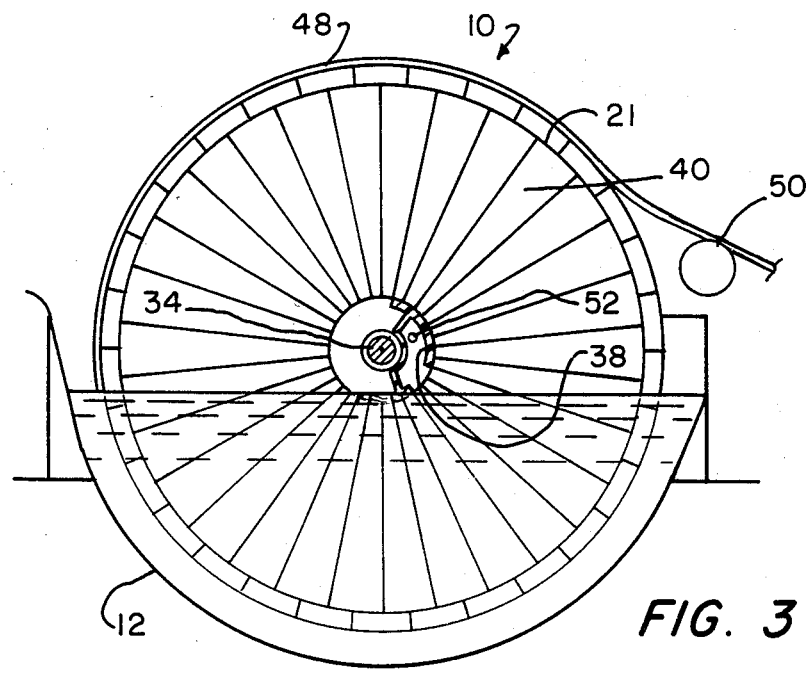
FIG. 3 is a cross-section of a portion of the drum useful in explaining the operation of the rotary drum filter.
Figure 4:
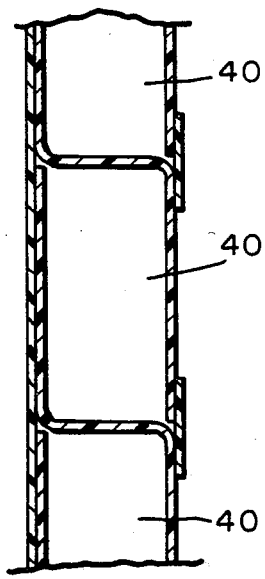
FIG. 4 is a sectional view taken along lines 4—4 of FIG. 2 and in the direction of the arrows.

As shown in FIG. 2, FIG. 3 and FIG. 4, a plurality of radial, fiberglass-reinforced, plastic drainage conduits 40, longitudinally-separated from the first plastic head 22 a predetermined distance "A", extends from deck 21 to the fiberglass-reinforced pipe 26. The connection of the fiberglass-reinforced drainage conduits 40 to the fiberglass-reinforced plastic pipe 26 is adjacent the inside end of the fiberglass-reinforced plastic pipe 26.

Referring to FIG. 1, a rotatable shaft 42 supported by pedestal 20 has connected thereto a cylindrical member 44 shown in broken lines in FIG. 1, which is, in turn, connected to a fiberglass-reinforced support 46. Though only one fiberglass-reinforced support 46 is shown, in practice, a plurality of fiberglass-reinforced supports 46 will probably be provided.

In operation and referring to FIG. 3, a slurry such as a pulp slurry is fed to the vat 12. As the drum 10 rotates, a pulp mat is formed on the deck 21 on the drum. The mat 48 is removed from the drum by means of the take-off roll 50. Referring to FIG. 2, central pipe 26, hub 28, bushing 30, sleeve 32, and drainage conduits 40 rotate about the stationary shaft 34 and stationary valve sector 38.

Referring to FIG. 3, valve sector 38 seals the drainage conduits 40 as the drum rotates from the twelve-o'clock position to the three-o'clock position. The drainage conduits 40 are open to the atmospheric vent 52 as they rotate from the three-o'clock position to the five-o'clock position. From the five-o'clock position to the twelve-o'clock position, a vacuum is applied to the drainage conduits 40.

The big advantage, of course, in having most of the elements of the rotary vacuum or pressure filter made of solid fiberglass-reinforced plastic is that fiberglass-reinforced plastic has good chemical resistance. It is not corroded by the strong chemicals contained in modern-day systems. However, the big problem with fiberglass-reinforced plastic is, among other things, that it has low strength and thus high stresses will break the material. It has low modulus of elasticity which means that the material must be constructed to avoid excessive deflection. It has a high coefficient of thermal expansion. The cylinder must be constructed to allow for thermal expansion without excessive stresses due to a difference in thermal expansion.

In use, a vacuum rotary filter drum is subjected to a very large buoyancy force. This buoyancy force causes large forces to be exerted against the heads 22 and 24. The fiberglass-reinforced plastic head 22 alone could not withstand the bending moment due to the buoyancy force. It would be difficult to build a strong enough head to withstand such moment from a practical standpoint. Therefore, the fiberglass-reinforced plastic drainage conduits 40 not only serve as drainage conduits, but also serve as a means for helping the head 22 withstand the buoyancy-bending moments. If the length of the fiberglass-reinforced plastic central pipe 26 is too long, the plastic pipe 26 would deflect and bend due to the buoyancy force bending moment. If the pipe 26 is too short, the head 22 must withstand too much radial load. Thus, the longitudinal separation "A" between the plastic drainage conduits 40 and the plastic head 22 must be very carefully chosen. The bending stresses caused by the buoyancy force is carried by the head 22 and the drainage conduits 40. As the separating distance "A" between head 22 and drainage conduits 40 increases, the radial force carried by head 22 is decreased. Thus, from the standpoint of radial force on the head 22, it is better if the distance "A" is greater. However, as pointed out, another difficulty with fiberglass-reinforced plastic is that differential thermal expansion causes problems. The longer the distance "A", the more head 22 will tend to deflect due to thermal expansion. Thus, from the standpoint of head deflection, it is better if the distance "A" between head 22 and drainage conduits 40 is less. Thus, as a compromise the separating distance "A" is large enough so that the radial force carried by head 22 is not sufficient to break the head 22 and, at the same time, the distance is sufficiently short that no real problem is caused by differential thermal expansion. The cylindrical head 22 is relatively thin, but its dimensions are such that it is strong enough to withstand the radial force, drive torque, and the hydraulic end force.

The separating distance "B" between the head 24 and the supports 46 at the other end of the drum 10 is preferably the same as the separating distance "A" between the head 22 and drainage conduits 40. In this manner, the bending moment due to the buoyancy force at the other end of the drum 10 is carried by the head 24 and supports 46.

I claim:

1. A rotary drum filter comprising: a fiberglass-reinforced plastic drum having a plastic deck, a first plastic head extending across one end of the plastic deck and supporting said one end and a second plastic head extending across the other end of the plastic deck and supporting said other end; a single central coaxial plastic pipe extending from the first plastic head a predetermined distance into the plastic drum; a plurality of radial fiberglass-reinforced plastic drainage conduits longitudinally-separated from the first plastic head a predetermined distance extending from the fiberglass-reinforced plastic deck to the single central coaxial plastic pipe, the longitudinal separation between the plastic drainage conduits and the first plastic head and the dimensions of the first plastic head being such that the first plastic head is strong enough to withstand the radial force, drive torque, and hydraulic end force.

2. A rotary drum filter in accordance with claim 1 wherein: fiberglass-reinforced plastic support members extend radially from the plastic deck toward the axis of the drum and are longitudinally-separated from the second plastic head approximately the same distance as the longitudinal separation of the radial drainage conduits from the first plastic head, and the dimensions of the second plastic head are substantially the same as the dimensions of the first plastic head.

* * * * *